United States Patent
Ahmed

(10) Patent No.: US 11,768,935 B2
(45) Date of Patent: Sep. 26, 2023

(54) SYSTEM AND METHOD FOR DETECTING AND PREVENTING EXTRACTION OF PLAINTEXT PASSWORDS USING MEMORY ATTACKS

(71) Applicant: Saudi Arabian Oil Company, Dhahran (SA)

(72) Inventor: Urfan Ahmed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 514 days.

(21) Appl. No.: 17/036,757

(22) Filed: Sep. 29, 2020

(65) Prior Publication Data

US 2022/0100854 A1   Mar. 31, 2022

(51) Int. Cl.
  *G06F 21/56* (2013.01)
  *G06F 3/06* (2006.01)

(52) U.S. Cl.
  CPC ............ *G06F 21/56* (2013.01); *G06F 3/0622* (2013.01); *G06F 3/0655* (2013.01); *G06F 3/0679* (2013.01); *G06F 2221/034* (2013.01)

(58) Field of Classification Search
  CPC ...... G06F 21/56; G06F 3/0622; G06F 3/0655; G06F 3/0679; G06F 2221/034
  See application file for complete search history.

(56) References Cited

U.S. PATENT DOCUMENTS

| | | | |
|---|---|---|---|
| 7,913,306 B2 | 3/2011 | Apap et al. | |
| 9,419,996 B2 | 8/2016 | Porat et al. | |
| 9,800,603 B1 | 10/2017 | Sidagni | |
| 10,162,962 B1 * | 12/2018 | Glick | G06F 21/6209 |
| 10,769,267 B1 * | 9/2020 | Li | G06F 21/316 |
| 2005/0021917 A1 | 1/2005 | Mathur et al. | |
| 2017/0228182 A1 | 8/2017 | Novak et al. | |
| 2017/0230372 A1 | 8/2017 | Weinstein et al. | |

(Continued)

FOREIGN PATENT DOCUMENTS

| CN | 105893107 A | 8/2016 |
|---|---|---|
| CN | 103701829 B | 1/2017 |
| CN | 110837640 A | 2/2020 |

OTHER PUBLICATIONS

Mead et al. "Detecting Credential Theft through Memory Access Modeling with Microsoft Defender ATP", Microsoft Security, Jun. 2020, 8 pages. (Year: 2020).*

(Continued)

*Primary Examiner* — Hee K Song
(74) *Attorney, Agent, or Firm* — Leason Ellis LLP

(57) ABSTRACT

A system and methodology for preventing extraction of an authentication credential from a memory in a computer. The system and methodology include identifying a memory area used by a native process, monitoring the memory area for any access of the memory area by a process, detecting when data is being read from the memory area, detecting an amount of data being read from the memory area, comparing the amount of data being read from the memory area to a data amount threshold value, and blocking access to the memory area or terminating said process when the amount of data being read from the memory area reaches or exceeds the data amount threshold. The native process can include a Windows® operating system lsass.exe process.

19 Claims, 6 Drawing Sheets

(56) References Cited

U.S. PATENT DOCUMENTS

2020/0042371 A1* 2/2020 Park .................. G06F 11/0751
2020/0195683 A1 6/2020 Kuppa et al.

OTHER PUBLICATIONS

Extended European Search Report in corresponding EP Application No. 21199574.1, dated Feb. 9, 2022; 11 pages.

Kheirhabarov Teymur; Hunting for Credentials Dumping in Windows Environment; https://2017.zeronights.org/wp-content/uploads/materials/ZN17_Kheirkhabarov_Hunting_for_Credentials_Dumping_in_Windows_Environment.pdf; Nov. 23, 2017; 61 pages.

"Detecting Credential Theft through Memory Access Modelling with Microsoft Defender ATP." Microsoft Security, Jun. 3, 2020, www.microsoft.com/security/blog/2019/05/09/detecting-credential-theft-through-memory-access-modelling-with-microsoft-defender-atp/. 8 pages.

"STEALTHbits Launches Purpose-Built Active Directory Threat Detection & Response Platform." STEALTHbits Launches Purpose Built Active Directory Threat Detection & Response Platform | Business Wire, Feb. 20, 2019, www.businesswire.com/news/home/20190220005646/en/STEALTHbits-Launches-Purpose-Built-Active-Directory-Threat-Detection-Response-Platform. 2 pages.

Sophos Introduces Predictive Protection in Intercept X with Advanced Deep Learning, Jan. 31, 2018, www.sophos.com/en-us/press-office/press-releases/2018/01/sophos-introduces-predictive-protection-in-intercept-x-with-advanced-deep-learning.aspx. 2 pages.

French, David. "Detecting Attempts to Steal Passwords from Memory." Medium, Threat Punter, Sep. 28, 2020, medium.com/threatpunter/detecting-attempts-to-steal-passwords-from-memory-558f16dce4ea. 5 pages.

"Windows Security Essentials: Preventing 4 Common Methods of Credentials Exfiltration." SentinelOne, May 19, 2020, www.sentinelone.com/blog/windows-security-essentials-preventing-4-common-methods-of-credentials-exfiltration/. 10 pages.

Mulder, J., and M. Stingley. "Mimikatz overview, defenses and detection." (2016). 20 pages.

* cited by examiner

SYSTEM AND METHOD FOR DETECTING AND PREVENTING EXTRACTION OF PLAINTEXT PASSWORDS USING MEMORY ATTACKS

FIELD OF THE DISCLOSURE

The present disclosure relates to a method, a system and a computer program for detecting and preventing extraction of a plaintext password on a computer resource asset and effectuating remediation to mitigate a cybersecurity risk or attack to the asset or a computer network to which the computer resource asset can connect.

BACKGROUND OF THE DISCLOSURE

The Internet is a worldwide network of interconnected computer networks that use the Transmission Control Protocol/Internet Protocol (TCP/IP) to link communicating devices worldwide. The Internet includes private, public, academic, business, and government networks, all of which are interlinked by arrays of electronic, wireless, wired, or optical networking technologies. The Internet carries a broad range of information resources and services, including the World Wide Web (WWW), electronic mail, telephony, and file sharing. As the Internet evolves and computer networks become increasingly under attack, cybersecurity solutions are taking on ever-greater importance. However, existing cybersecurity solutions have significant shortcomings that are addressed by the cybersecurity solution provided in this disclosure.

SUMMARY OF THE DISCLOSURE

The disclosure provides an effective and reliable cybersecurity solution that includes a method, system and computer program for monitoring processes running code in-process with a native process to read data from a native process memory and detecting a cyberattack event where a process carries out a technique, such as, for example, credential dump to extract authentication credentials like user names and passwords from the native process memory, including usernames and passwords in plaintext.

In a nonlimiting embodiment, a computer-implemented method is provided for preventing extraction of an authentication credential from a memory in a computer. The method comprises identifying a memory area used by a native process, monitoring the memory area for any access of the memory area by a process, detecting when data is being read from the memory area, detecting an amount of data being read from the memory area. comparing the amount of data being read from the memory area to a data amount threshold value, and blocking access to the memory area or terminating said process when the amount of data being read from the memory area reaches or exceeds the data amount threshold. The native process can include a Windows® operating system lsass.exe process.

The computer-implemented method can comprise generating an alert signal when the amount of data being read from the memory area reaches or exceeds the data amount threshold.

The computer-implemented method can comprise determining a process parameter for said process, wherein the process parameter includes at least one of a process name, a process location and a process hash.

In the computer-implemented method, the authentication credential can comprise a cleartext password, a password hash or a Kerberos token.

The computer-implemented method can comprise checking if said process is an allowed process based on the process parameter.

The computer-implemented method can comprise comparing the process parameter against data in an access repository and determining if the data in the access repository includes a matching process parameter.

The computer-implemented method can comprise determining said process is an allowed process when the data in the access repository includes the matching process parameter.

The computer-implemented method can comprise determining said process is not an allowed process when the data in the access repository does not include the matching process parameter.

The computer-implemented method can comprise checking if the computer-implemented method is in a learning mode or a protect mode, and allowing the data in the access repository to be updated when the computer-implemented method is in the learning mode.

In another nonlimiting embodiment, a system is provided for preventing extraction of an authentication credential from a memory in a computer. The system comprises: a process monitor arranged to identify a memory area used by a native process, monitor the memory area for any access by a process, detect when data is being read from the memory area, and detect an amount of data being read from the memory area; an attack detector arranged to compare the amount of data being read from the memory area to a data amount threshold value, and detect a cyberattack event when the amount of data being read from the memory area reaches or exceeds the data amount threshold; and, a remediation unit arranged to block access to the memory area or terminate said process based on the cyberattack event, wherein the native process includes a Windows® operating system lsass.exe process.

The system can comprise an alert generator arranged to generate an alert signal based on the cyberattack event.

The system can comprise an access repository containing a process parameter, wherein the process parameter includes at least one of a process name, a process location, a process hash and the amount of data being read from the memory area.

The system can comprise an application repository containing a table of computing resources or processes allowed to run on an operating system.

In the system, the application repository can contain a process parameter for each computing resource or process in the table computing resources or processes, and wherein the process parameter includes at least one of a computing resource name or process name, a computing resource or process location, and a process hash.

In the system, the table of computing resources or processes can comprise all computing resources or processes installed in the computer.

In a further nonlimiting embodiment, a non-transitory computer readable storage medium is provided that contains credential extraction prevention program instructions for preventing extraction of an authentication credential from a memory in a computer. The program instructions, when executed by a processor, cause the processor to perform an operation comprising identifying a memory area used by a native process, monitoring the memory area for any access of the memory area by a process, detecting when data is being read from the memory area, detecting an amount of data being read from the memory area, comparing the amount of data being read from the memory area to a data amount threshold value, and blocking access to the memory area or terminating said process when the amount of data being read from the memory area reaches or exceeds the data amount threshold. The native process can include a Windows® operating system lsass.exe process.

In the computer readable storage medium, the operation can comprise generating an alert signal when the amount of data being read from the memory area reaches or exceeds the data amount threshold.

In the computer readable storage medium, the operation can comprise determining a process parameter for said process, wherein the process parameter includes at least one of a process name, a process location and a process hash, and wherein the authentication credential comprises a cleartext password.

In the computer readable storage medium, the operation can comprise comparing the process parameter against data in an access repository and determining if the data in the access repository includes a matching process parameter.

In the computer readable storage medium, the operation can comprise determining said process is an allowed process when the data in the access repository includes the matching process parameter, or determining said process is not an allowed process when the data in the access repository does not include the matching process parameter.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

Figure 1:
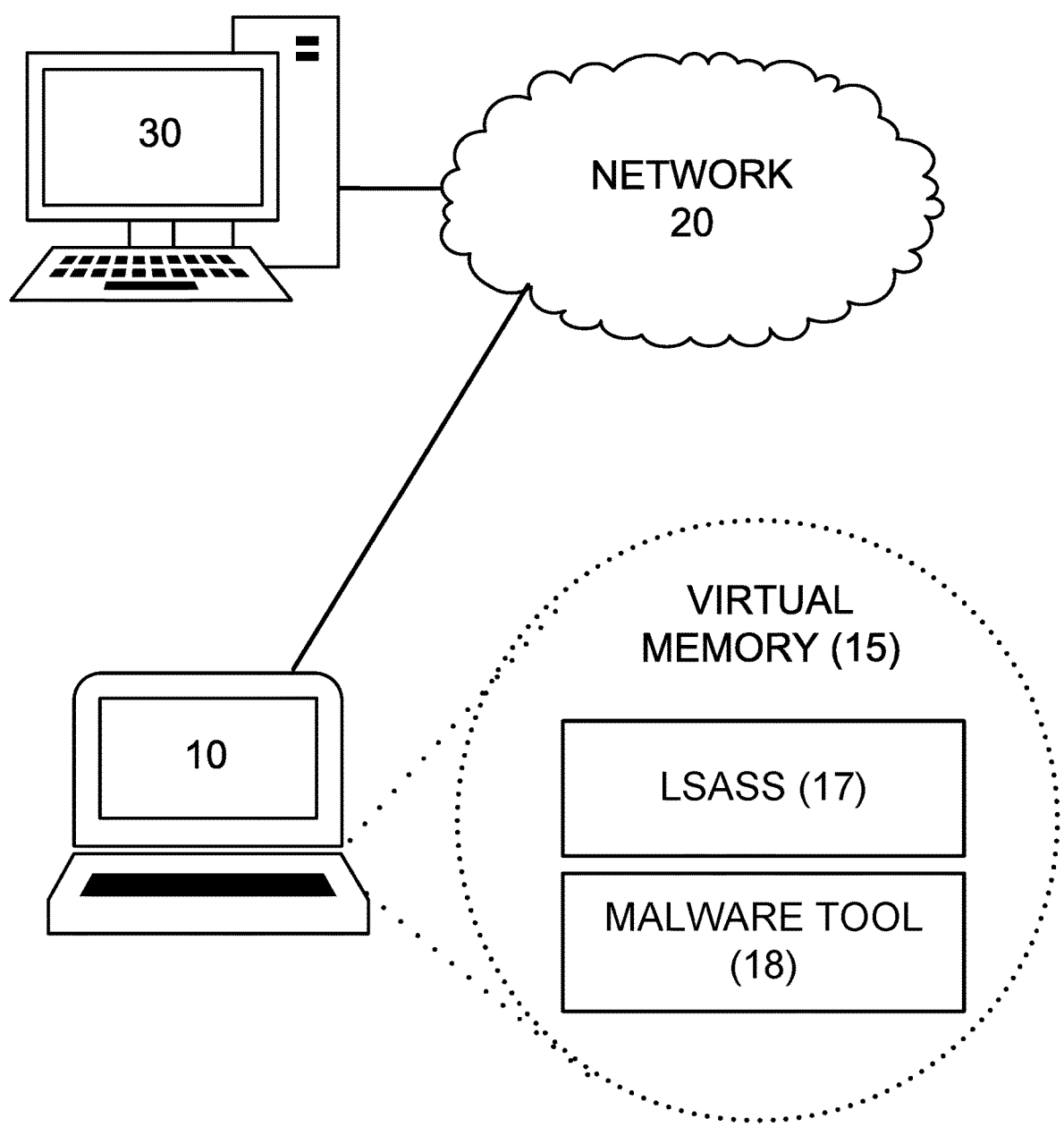
FIG. 1 shows a nonlimiting example of an attack vector used to breach an asset or network through a compromised end-user asset and extract authentication credentials from the asset's memory.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

Computer network systems are continuously under attack. Often, hackers and cybercriminals are after data on computer resource assets or computer networks that they can monetize or use in some way. The attacks are not always direct, but frequently involve attacks made possible through computer resource assets ("assets") such as end-user computing devices. The assets, or their users, may not have any awareness that they are serving as vehicles in attempts by unscrupulous individuals to breach network security and access proprietary information on a computer network system, or in some way adversely impact or affect the computer network. Numerous computer network systems have recently been breached through end-user assets, such as, for example, personal laptop computers, smartphones or vendor point-of-sale (PoS) communicating devices that had access to the computer networks.

Computer network systems typically implement security authentication technologies as frontline defenses to thwart cyberattacks. The authentication technologies include, for example, single-factor authentication, multi-factor authentication, layered authentication (or strong authentication), continuous authentication or digital authentication. Regardless of the type of authentication technology, authentication credentials such as usernames and passwords are commonly used as key factors to authenticating a user or asset before permitting access to a computer network. Username-password pairs are the most popular authentication method, mainly because they are easy to implement, require no special hardware or software, and are familiar to users and developer. Unfortunately, authentication credentials are typically stored in memory such that they can be accessible to attackers.

In recent hacking operations, cyber-attackers have exploited computing resources that already exist on victim assets ("native applications"), such as, for example, the Microsoft® Windows® operating systems. Operating systems typically include a native process, such as, for example, Local Security Authority Subsystem Service (LSASS) in Windows®, to manage and enforce security policies. Such native processes can access, store, receive or send authentication credentials, including usernames and passwords. In many instances, the usernames and passwords are stored or transferred in plaintext (or cleartext), thereby making them easy to read or copy. Native processes have been known to access, store, receive or send encrypted credentials and their encryption/decryption keys.

As of the date of this writing, the native process (that is, the LSASS process) in the Windows® operating system typically has the process name "lsass.exe". Thus, for assets that, hacking operations have targeted the native process, lsass.exe, on victim assets that run Windows® operating systems for credential dumping.

The term "credential dumping" refers to any means of extracting user authentication credentials such as usernames and passwords from a victim asset. Credential dumping is commonly used by cyber-attackers to extract authentication credentials, which can then be sold or used to enter that asset at will and reach other assets on a computer network on which that asset is connected or can connect.

FIG. 1 depicts a nonlimiting example of a credential dumping attack vector that has been used to extract authentication credentials on a victim asset 10. The attack vector has been used on assets such as, for example, personal computers, smartphones and vendor point-of-sale (PoS) communicating devices. In this example, the victim asset 10 is an end-user computing device that connects to a network 20. In this attack vector example, the asset 10 is compromised via social engineering from the Internet and injected with a malware tool 18 that contains a malware computing resource, such as for example, Mimikatz, Procdump, PowerShell Empire, Koadic, or Metasploit.

To carry out credential dumping, the cyber-attacker calls a network help desk, and persuades the help desk operator to log into a network system via an administrator computing device 30 and connect to the compromised computing device 10 via a Remote Desktop Protocol (RDP) session, such as, for example, via the network 20. Once the RDP session is established and the devices 10 and 30 are connected, the device 10 and, more particularly, the malware tool 18, will be able to run code in-process with the native process, for example, the Windows® operating system LSASS, and read the authentication credentials from memory 15—more specifically, a memory region 17 that is used as a native process memory by the LSASS process to store authentication credentials.

In this nonlimiting example, the memory 15 is the system memory used by the Windows® operating system in the device 10. The authentication credentials can include, in addition to usernames and passwords, encryption/decryption keys, username hashes and passwords hashes. The malware tool 18 can be arranged to download (or "dump") all operating system data from memory using a command such as, for example, "dumpit.exe."

The LSASS process uses a protected system process that can authenticate and log the user on to the device 10, and authenticate and log domain credentials that can be used by the operating system. The LSASS process can validate credentials by checking a Security Accounts Manager (SAM) database located on the device 10. The LSASS process is a native process that can access, store, read or write credentials from or to memory in the device 10. The native process can read or write credentials, for example, as a set of objects, including, but not limited to, account details about a user, group, or local group account, server account passwords, and network passwords. The native process can manage the local system policy, user authentication, and auditing while handling sensitive security data such as password hashes and Kerberos keys. Certain parts of the credentials, such as passwords, are protected by the operating system and only code running in-process with the native process can read or write credentials. Hence, the code running in-process with the native process (for example, "lsass.exe") can be exploited by a cyber-attacker to read credentials from the memory 15 in the device 10.

Once read, the credentials can be used to gain unfettered access to the device 10 or network to which the device 10 can connect. With unfettered access, the malware tool 18 is able to access and dump some or all credentials from the system, including usernames, plaintext passwords, reversibly encrypted plaintext passwords, hashes (for example, NTLM hashes), PINs (including, for example, plaintext PINs for smart cards), encryption/decryption keys, and Kerberos tickets. Since the LSASS process can allow single sign-on and access control to network computing resources, such as file shares, exchange server mailboxes, and SharePoint sites, without re-entering credentials for each remote service, just about any asset on the network system can be access or exploited.

Present-day cybersecurity solutions tend to be signature-based, or they use whitelisting to block certain executable files from running on an asset. However, such solutions are frequently ineffective where attackers rely on native applications or native processes that already exist within operating systems, such as, for example, the Windows® LSASS process, to conduct their attacks. This shortcoming of existing solutions has left assets, and the networks to which they connect, vulnerable to cyberattacks that rely on or exploit native processes on victim assets.

The instant cybersecurity solution addresses the shortcomings of such existing solutions, as well as others. A system and a methodology are provided that can detect a cyberattack that targets authentication credentials and actively prevent the attack. The system and methodology can prevent the attack by, for example, terminating or blocking any process that runs code in-process with a native process to read data from a native process memory. The system and methodology can prevent cyberattacks that use malware tools, such as, for example, Mimikatz, Procdump, PowerShell Empire, Koadic, or Metasploit to harvest credentials from victim assets using native processes in operating systems.

The system and methodology can detect and prevent such attacks from obtaining credentials, including plaintext passwords. The system and methodology can be readily and easily implemented on any asset that includes a processor, to monitor credential data being read from memory by a native process, such as, for example, the lsass.exe process running on a Windows® operating system. The system and methodology can be arranged to monitor the amount of data (for example, the number of bytes of data) being read from the native process memory by the native process, as well as identify the computing resource process ("suspect process") that runs code in-process with the native process to read from the memory. When the number of bytes being read from the native process (for example, lsass.exe) is greater than a predetermined data amount threshold value, or the suspect process is determined to be unknown, then a remediation process can be implemented, which can include terminating the suspect process or the native process, and generating an alert signal that indicates a cyberattack event might have occurred. The remediation process can include generating an alert signal and rendering an alert locally or sending the alert signal to an asset operated by, for example, security analyst or security team.

Figure 2:
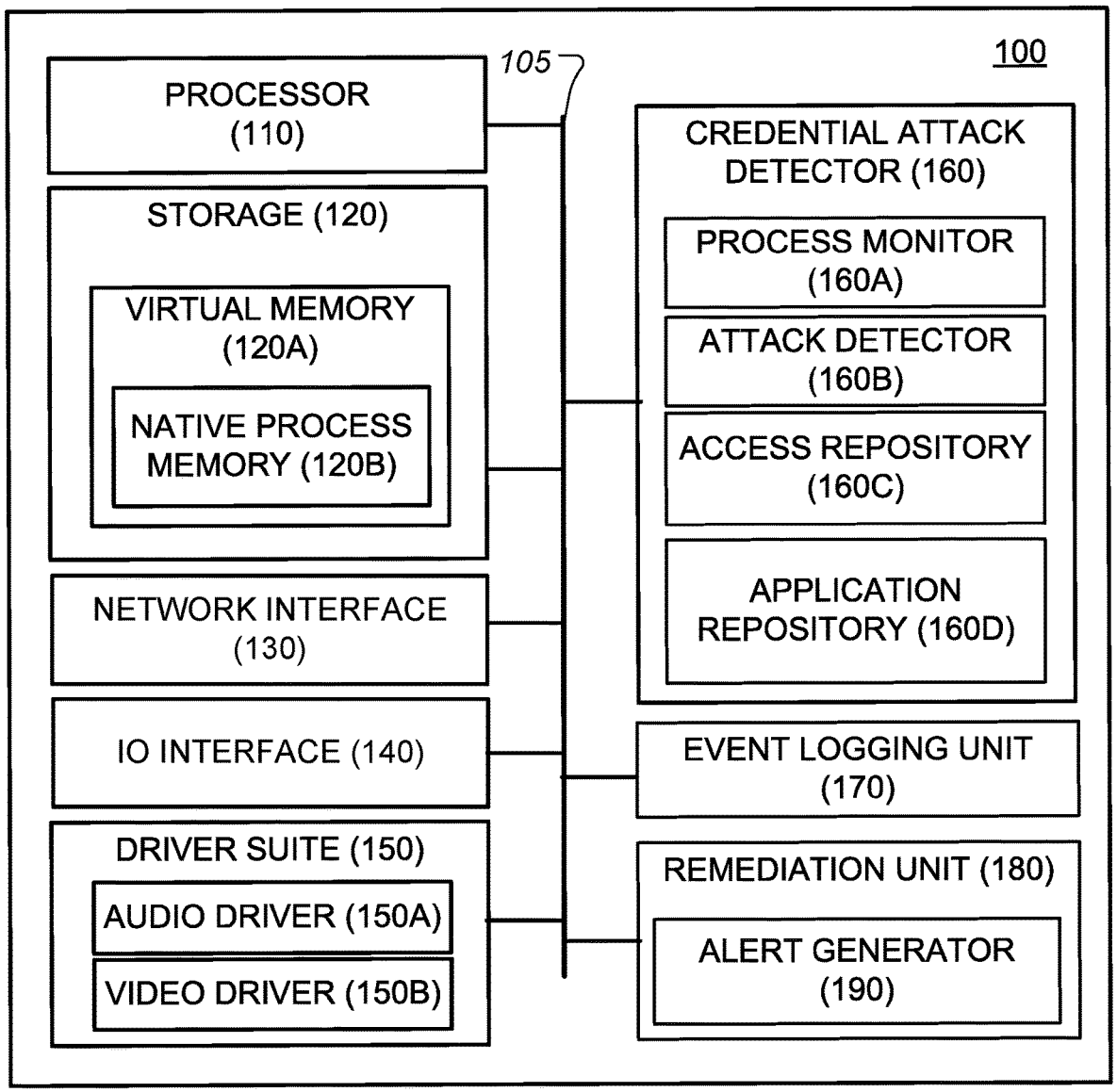
FIG. 2 shows a non-limiting embodiment of a cybersecurity system, constructed according to the principles of the disclosure.

FIG. 2 shows a non-limiting embodiment of a cybersecurity system 100, constructed according to the principles of the disclosure. The system 100 can be arranged to implement the various aspects of the solution. The system 100 can be arranged to monitor all reading of data, including credential data, from a native process memory 120B, including any data being read by the native process. The system 100 can determine the amount of data being read from the native process memory 120B by a suspect process and detect or predict a cyberattack event.

As seen in FIG. 2, the native process memory 120B can be contained in virtual memory 120A in the storage 120 and include authentication credentials that are maintained or read by the native application via its native process. Upon detecting or predicting the cyberattack event, the system 100 can implement a remediation process to protect the data in the native process memory, including, for example, terminating or causing the operating system to terminate the suspect process or the native process.

In a nonlimiting embodiment, the system 100 can be installed in a computing device, such as, for example, the end-user computing device 10 (shown in FIG. 1). The implementation can be made according to any number of embodiments contemplated by this disclosure, including: physically installing the cybersecurity system 100 in the computing device 10; or, installing a credential attack detector 160, an event logging unit 170 and a remediation unit 180 in the device 10; or, installing a kernel driver that can monitor the native process memory or native process and interact with the operating system on the device 10 according to, for example, a process 200 (shown in FIGS. 4A-4C), discussed below.

The computing device 10 can include assets that can be arranged or configured to operate similarly to, or substantially the same as the assets in the system 100, for example, according to the nonlimiting examples discussed below. In that nonlimiting embodiment, the assets 160 to 190 can include computing resources that can be downloaded to and installed on the computing device 10. For instance, the credential attack detector 160, the event logging unit 170 and the remediation unit 180 can be installed on the operating system or provided as kernel drivers in the computing device 10 (shown in FIG. 1).

Figure 3:
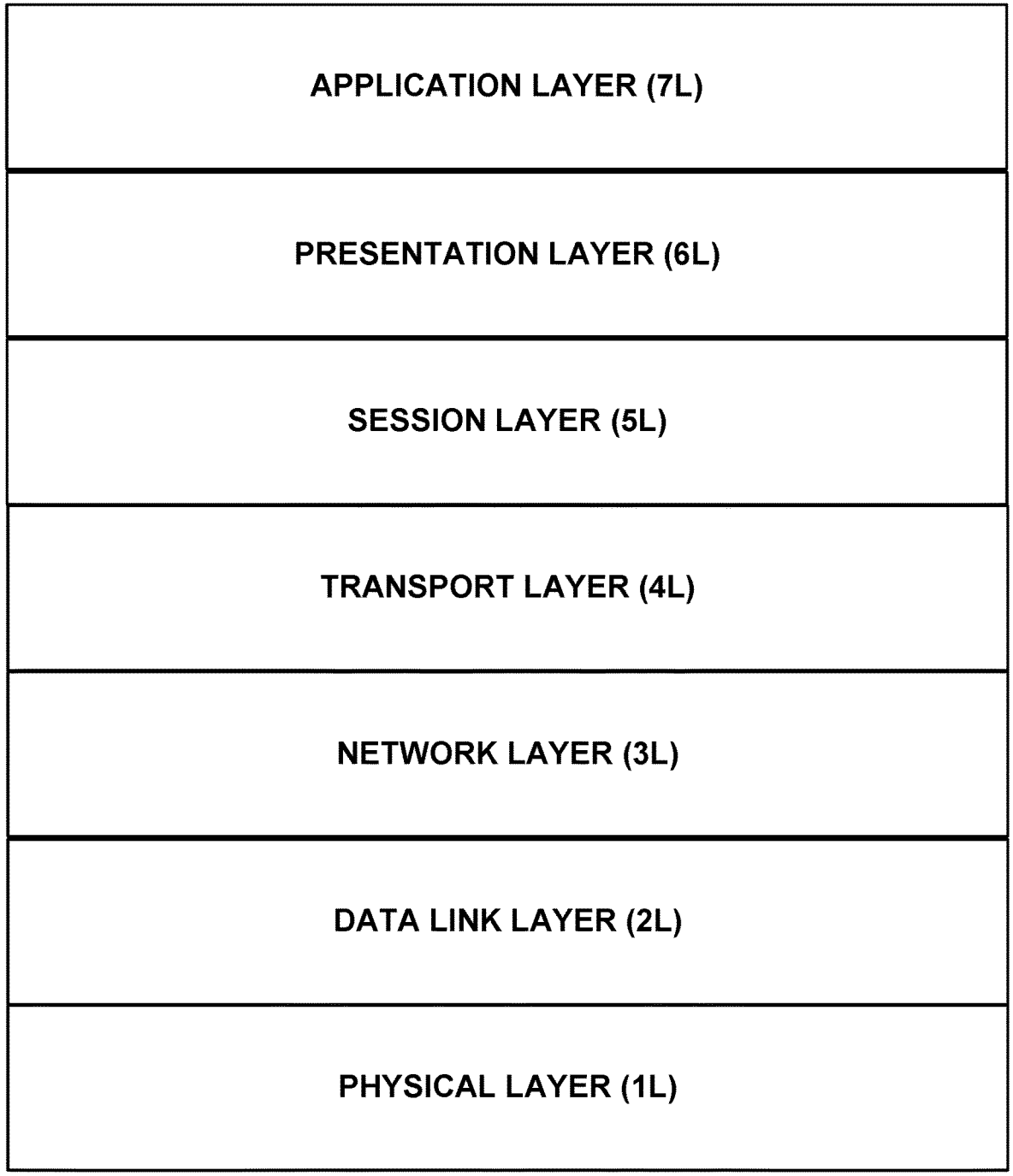
FIG. 3 shows the seven-layer Open Systems Interconnection (OSI) model implemented in the disclosure.

FIG. 3 depicts an example of the seven-layer OSI model that can be implemented by the assets in the system 100 (shown in FIG. 2). Beginning with the highest layer—the application layer 7L—this is the OSI layer in an asset that is closest to the user. The application layer 7L interacts with software applications in the system 100 that implement a communicating component. The application layer 7L can include any application interface that can interact with a user to, for example, open, close, modify or run a process in the system 100.

The presentation layer 6L can establish context between software applications, which might use different syntax and semantics. The presentation layer 6L can transform data into a form that each software application can accept. An operating system on an asset is an example of the presentation layer 6L.

The session layer 5L controls the communication connections between the assets in the system 100, as well as connections to assets outside the system 100, such as, for example, the device 30 or the network 20 (shown in FIG. 1). This layer can be responsible for establishing, managing and terminating connections between local and remote assets. The layer can provide for full-duplex, half-duplex, or simplex operations, and can be responsible for establishing checkpointing, adjournment, termination, and restart procedures.

The transport layer 4L can provide the functional and procedural mechanisms necessary for transferring variable-length data sequences from a source asset or process to a destination asset or process, while maintaining quality-of-service (QoS). The transport layer 4L can control the reliability of a given link through flow control, segmentation and de-segmentation, or error control. The transport layer 4L can include, for example, tunneling protocols, the Transmission Control Protocol (TCP) and the User Datagram Protocol (UDP).

The network layer 3L can provide the functional and procedural mechanisms for transferring data packets from an asset in the system 100 to another asset such as, for example, the device 30 or the network 20 (shown in FIG. 1). If the data to be transmitted is too large, the network layer 3L can facilitate splitting the data into a plurality of segments at the asset and sending the fragments independently to the other assets, where the segments can be reassembled to recreate the transmitted data. The network layer 3L can include one or more layer-management protocols such as, for example, routing protocols, multicast group management, network layer information and error, and network layer address assignment.

The link layer 2L can be responsible for node-to-node transfer between assets in a communication system. In IEEE 802 implementations, the link layer 2L is divided into two sublayers, consisting of a medium access control (MAC) layer and a logical link control (LLC) layer. The MAC layer is responsible for controlling how devices in a network gain access to a medium and permission to transmit data. The LLC layer is responsible for identifying and encapsulating network layer protocols, and for controlling error checking and frame synchronization.

The physical layer 1L can include the hardware that connects the assets. The hardware can include for example connectors, cables, switches, or routers, that provide for transmission and reception of instruction and data streams between the assets.

Referring to FIG. 2, the cybersecurity system 100 can include a processor 110, a storage 120, a network interface 130, an input-output (IO) interface 140, a driver suite 150, the credential attack detector 160, the event logging unit 170 and the remediation unit 180. The system 100 can include an alert generator 190, which can be included in the remediation unit 180, as seen in FIG. 2, or provided as a separate asset (not shown). The system 100 can include a bus 105, which can be connected to any or all of the assets 110 to 190 by a communication link.

Any one or more of the assets 120 to 190 can include a computing resource or computing device that is separate from the processor 110, as seen in FIG. 2, or integrated with the processor 110. Any of the assets 130 to 190 can include a computer resource that can be executed on the processor 110 as one or more processes. The computer resources can be contained in the storage 120.

The bus 105 can include any of several types of bus structures that can further interconnect to a memory bus (with or without a memory controller), a peripheral bus, and a local bus using any of a variety of commercially available bus architectures.

The processor 110 can include any of various commercially available processors, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture. The processor 110 can include the processor (not shown) in the computing device 10 (shown in FIG. 1), such as, for example, an existing microprocessor or multiprocessor in the computing device 10. The processor 110 can be arranged to interact with any of the assets 120 to 190 to carry out or facilitate the processes included, described or contemplated by this disclosure.

The processor 110 can be arranged to run an operating system (OS), which can include an operating system (OS) kernel that can control all operations on the cybersecurity system 100. In a nonlimiting embodiment, the processor 110 can include the processor (not shown) in the computing device 10 (shown in FIG. 1).

The OS kernel can include, for example, a monolithic kernel or a microkernel. The OS kernel can be arranged to execute on the processor 110 and have control over operations in the processor 110.

The OS or OS kernel can be contained in the storage 120 and executed by the processor 110. The OS or OS kernel can be cached in the storage 120, such as, for example, in a random access memory (RAM). The OS kernel can represent the highest level of privilege on the OS or the processor 110. The OS can include a driver for each hardware device with which the processor 110 might interact.

The OS can be arranged to use built-in data structures such as atomic tables to help processes executing on the operating system determine if they are already running or have previously run on the OS, in which case each previously run process can be referred to as an "instantiated process." The operating system can be arranged to monitor those built-in functions, record or log what can be considered normal during the "learning mode" and prevent or terminate execution of suspect processes or a native process when it is determined that the suspect process exceeds a data amount threshold ($DA_{Th}$) value (or data rate threshold ($DR_{Th}$) value) in the amount of data (DA) being read from memory 120B, such as by running code in-process with the native process (for example, lsass.exe) during the "protect mode." Accordingly, theft of credentials, including "credential dumping", can be prevented from occurring.

An atom table is a global table that is available to all processes running on the operating system of the processor 110. When a process places a string in the global atom table, the atom will be unique throughout the operating system. This table can be shared amongst the processes in the processor 110. The atom table can contain an atom value for each instantiated process. The atom table can be contained in, for example, an application repository 160D (discussed below). The atom table can be used by the operating system to control access to a common resource, such as, for example, a section of computer program code. The atom table can be included in an access repository 160C or application repository 160D (shown in FIG. 2).

An atomic operation is one that cannot be divided into smaller parts. Atomic operations can be critically important when handling shared resources on an operating system. At its most basic level, an atomic operation is an operation performed by the operating system that is isolated from all other operations that might be executed concurrently.

The OS kernel can be arranged to allocate resources or services to, and enable computing resources or processes to share or exchange information, protect the resources or services of each computing resource or process from other computing resources or processes, or enable synchronization amongst the computing resources or processes.

The OS kernel can, when a process is triggered, initiate and carry out the process for that computer resource, including allocating resources for the process, such as, for example, hard disk space, memory space, processing time or space, or other services on one or more hardware devices (not shown). The OS kernel can carry out the process by allocating memory space and processing resources to the process, loading the corresponding computing resource (or portion of a computing resource) into the allocated memory space, executing instructions of the computing resource on the OS kernel, or interfacing the process to one or more computer resources or processes, including, for example, the native process (for example, lsass.exe) to read data from a native process memory by running code in-process with the native process.

The OS kernel can be arranged to facilitate interactions between the computing resources or processes. The processor 110, which runs the OS, can be arranged to arbitrate access to services and resources by the processes, including, for example, running time on the processor 110. The OS kernel can be arranged to take responsibility for deciding at any time which of one or more processes should be allocated to any of the resources. The OS kernel can be arranged to determine whether a request from a process is appropriate or authorized, such as, for example, a request to access or run a computing resource (for example, section of computer code) or service on the OS, or to access an asset (such as, for example, memory space, a data file, an executable file, or a library), connect to the Internet, or view configuration data.

The OS kernel can be arranged to maintain a data structure for each computing resource that might or can interact with the processor 110, directly or indirectly. The data structure can be stored in, for example, the application repository 160D (discussed below). The data structure can include, for example, a description of the state and resources or services owned by each computing resource, thereby enabling the OS kernel to exert control over each computing resource and corresponding process. The data structure can include the file name and file location for each computing resource. The OS kernel can include, in addition to the atom table, a data structure such as, for example, Process Control Block (PCB), Thread Controlling Block (ThCB), Task Controlling Block (TCB), Task Struct, Switchframe or any other data structure suitable for the OS kernel to manage each of the processes for the computing resources, including runtime scheduling, memory access, input/output (I/O) interface access or performance monitoring.

For each computing resource, the data structure can include, for example, process identification data, process state data, and process control data to uniquely identify each corresponding process when running on the OS kernel. The OS can reference the data structure for each process when determining whether to allow the process to access, run or connect to a computing resource or service. For instance, the OS can reference the data structure in the application repository 160D (shown in FIG. 2) and determine whether a computing resource can run code in-process with the native process to read data from the native process memory 120B (shown in FIG. 2). The process identification data can include a process identifier (or PID) such as commonly used in operating system kernels in, for example, UNIX, macOS® or Windows®, to uniquely identify each process running on the OS kernel. The process identification data can be used by the OS kernel as a process parameter in function calls, runtime scheduling, atom calls, termination, or other actions related to the process.

In a nonlimiting embodiment, the OS kernel can be arranged to access or modify the data structure (for example, PCB) when managing or executing processes, including scheduling, memory access, input-output (I/O) interface access, or performance monitoring. The OS kernel can create or update the atom table for each process, which can be included in the access repository 160C (shown in FIG. 2). The OS kernel can be arranged to prevent any changes or write instructions during the "protect mode." The OS kernel can create or update, for example, a memory table, an input-output (I/O) device table, and a process table, such as, for example, during the "learning mode." The memory table can include, for example, information about the allocation of main or virtual memory for each process, including the native process, and authorization attributes for accessing memory areas shared among different processes running on the OS kernel. For instance, the memory table can include information about the allocation of the virtual memory 120A and native process memory 120B (shown in FIG. 2).

The cybersecurity system 100 can include a non-transitory computer-readable storage medium that can hold executable or interpretable computer resources, including computer program code or instructions that, when executed by the processor 110, cause the steps, processes or methods in this disclosure to be carried out, including the process 200 (shown in FIGS. 4A-4C), discussed below. The computer-readable storage medium can be included in the storage 120.

The storage 120 can include a read-only memory (ROM), a random-access memory (RAM), a hard disk drive (HDD), an optical disk drive (ODD), and a database (DB). The storage 120 can provide nonvolatile storage of data, data structures, and computer-executable instructions, and can accommodate the storage of any data in a suitable digital format.

The storage 120 can include the non-transitory computer-readable medium that can hold the computer resources (including code or instructions) that can be executed (run) or interpreted by the operating system on the processor 110. The computer-readable medium can be contained in the HDD or ODD. The computer readable medium can include sections of computer code or instructions that, when executed by the processor 110, cause: monitoring of all reading of memory being carried out in-process with the native process, including the amount of data (DA) being read from the native process memory 120B; comparing the amount of data (DA) being read against a data amount threshold ($DA_{Th}$) value; and, if the amount of data being read exceeds the data amount threshold ($DA > DA_{Th}$), predicting or determining a cyberattack event being carried out by a suspect process. The computer code or instructions can, when executed by the processor 110, cause remedial actions to be executed, including, for example, terminating the suspect process, native process or reading from the native process memory. The remedial action can include creating an alert signal, which can be sent, for example, to an asset (not shown) operated by a security analyst or rendered locally by the system 100 on a display device (not shown) at the instruction of the processor 110. The alert signal can include identifying information about the computing resource and process that triggered the cyberattack event determination, including, for example, file name, file location, process name, process identification number, process location, process hash, and timestamp of the time at which the event occurred. The alert signal can include information about the location of the asset (for example, IP address or MAC address of the device 10, shown in FIG. 1), as well as information about the data on the asset that might have been accessed or read.

A basic input-output system (BIOS) can be stored in the non-volatile memory in the storage 120, which can include, for example, a ROM, an erasable programmable read-only memory (EPROM), or an electrically erasable programmable read-only memory (EEPROM). The BIOS can contain the basic routines that help to transfer information between any one or more of the assets 110 to 190 in the system 100, such as during start-up.

The RAM can include dynamic random access memory (DRAM), a synchronous dynamic random access memory (SDRAM), a static random access memory (SRAM), a non-volatile random access memory (NVRAM), or another high-speed RAM for caching data.

The HDD can include, for example, an enhanced integrated drive electronics (EIDE) drive, a serial advanced technology attachments (SATA) drive, or any suitable hard disk drive for use with big data. The HDD can be configured for external use in a suitable chassis (not shown). The HDD can be arranged to connect to the bus 105 via a hard disk drive interface (not shown). The hard disk drive interface (not shown) can include a Universal Serial Bus (USB) (not shown) or an IEEE 1394 interface (not shown) for external applications. In a nonlimiting implementation, the HDD can include the credential attack detector 160, event logging unit 170 or remediation unit 180.

The ODD can be arranged to read or write from or to a compact disk (CD)-ROM disk (not shown), or, read from or write to other high capacity optical media such as a digital versatile disk (DVD). The ODD can be connected to the bus 105 by an optical drive interface (not shown).

The DB can be arranged to be accessed by any one or more of the assets in the system 100. The DB can be arranged to receive a query and, in response, retrieve specific data, data records or portions of data records based on the query. A data record can include, for example, a file or a log. The DB can include a database management system (DBMS) that can interact with the assets 110 to 190. The DBMS can include, for example, SQL, NoSQL, MySQL, Oracle, Postgress, Access, or Unix. The DB can include a relational database.

The DB can be arranged to contain information about each computer resource or process in, for example, the computing device 10 (shown in FIG. 1). The DB can include the application repository 160D, or the application repository 160D can be arranged as a separate asset, as seen in FIG. 2. The DB can contain, for example, configuration data, Internet Protocol (IP) address, media access control (MAC) address, policies, or rules.

Any number of computer resources can be stored in the storage 120, including, for example, a program module, an operating system (not shown), one or more application programs (not shown), or program data (not shown). Any (or all) of the operating system, application programs, program modules, and program data can be cached in the RAM as executable sections of computer code.

The network interface 130 can connect to the network 20 or computing device 30 (shown in FIG. 1). The network interface 130 can include a wired or a wireless communication network interface (not shown) or a modem (not shown). When used in a local area network (LAN), the network interface 130 can connect to the LAN network through the wired or wireless communication network interface; and, when used in a wide area network (WAN), it can connect to the WAN network through the modem. The computer network 20 (shown in FIG. 1) can include a LAN, a WAN, the Internet or any other network. The modem (not shown) can be internal or external and wired or wireless. The modem can be connected to the system bus 105 via, for example, a serial port interface (not shown). The network interface 130 can include a receiver (not shown), transmitter (not shown) or transceiver (not shown).

The input-output (IO) interface 140 can receive instructions or data from an operator via a user interface (not shown), such as, for example, a keyboard (not shown), a mouse (not shown), a pointer (not shown), a stylus (not shown), a microphone (not shown), a speaker (not shown), or a display device (not shown). The received instructions and data can be forwarded from the IO interface 140 as signals via the bus 105 to any asset in the system 100.

The driver suite 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The credential attack detector 160 can include one or more machine learning platforms, including one or more supervised machine learning platforms or one or more unsupervised machine learning platforms. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for searching or analyzing plaintext and detecting or predicting plaintext credentials. The machine learning platform(s) can include a machine learning (ML) model that can monitor reading from the native process memory, or reading carried out by a process running code in-process with the native process to read data from the native process memory. The ML model can be trained such that a data amount threshold value ($DA_{TH}$) can be determined that avoids allowed or permitted processes from triggering a cyberattack event prediction or determination during normal or authorized operation of the process 110.

The credential attack detector 160 can include a suite of one or more assets, including a process monitor 160A, an attack detector 160B, the access repository 160C and the application repository 160D. The process monitor 160A can be arranged to interact with or run on the processor 110 and check and enumerate all processes running on the operating system. The process monitor 160A can be arranged to monitor, identify and create a record of every process that runs code in-process with the native process to read or write credentials from or to memory. The record can include the name of the process, a file location, a canonical path, a process identification number, the process' hash, the amount of data (DA, for example, in bytes) being read from memory 120B in-process with the native process, and the rate (DR, for example, bytes-per-second) at which the data is being read from the memory.

Figure 4A:
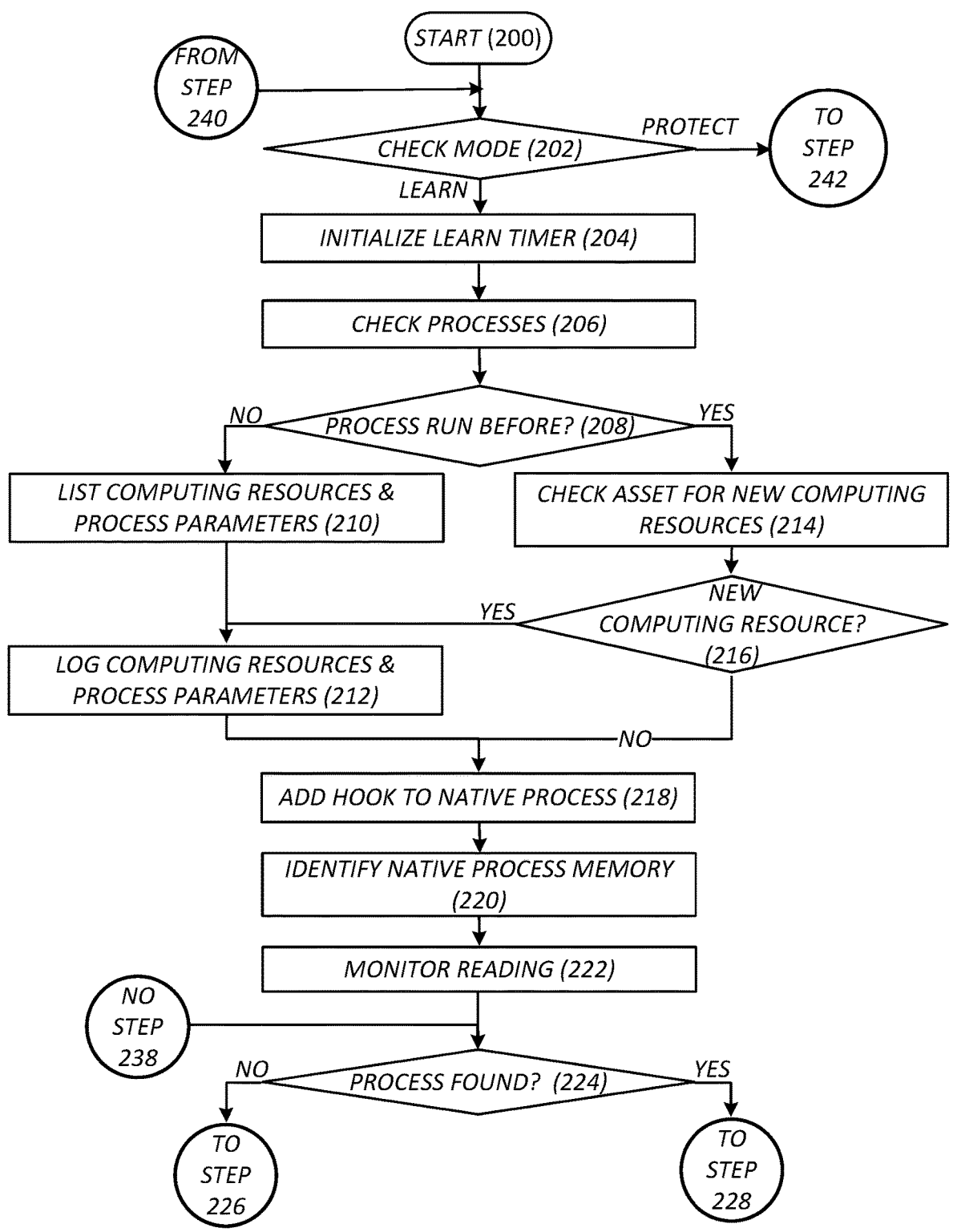
FIGS. 4A to 4C show a flow-diagram of a nonlimiting embodiment of a cybersecurity threat remediation process according to the principles of the disclosure.
Figure 4B:
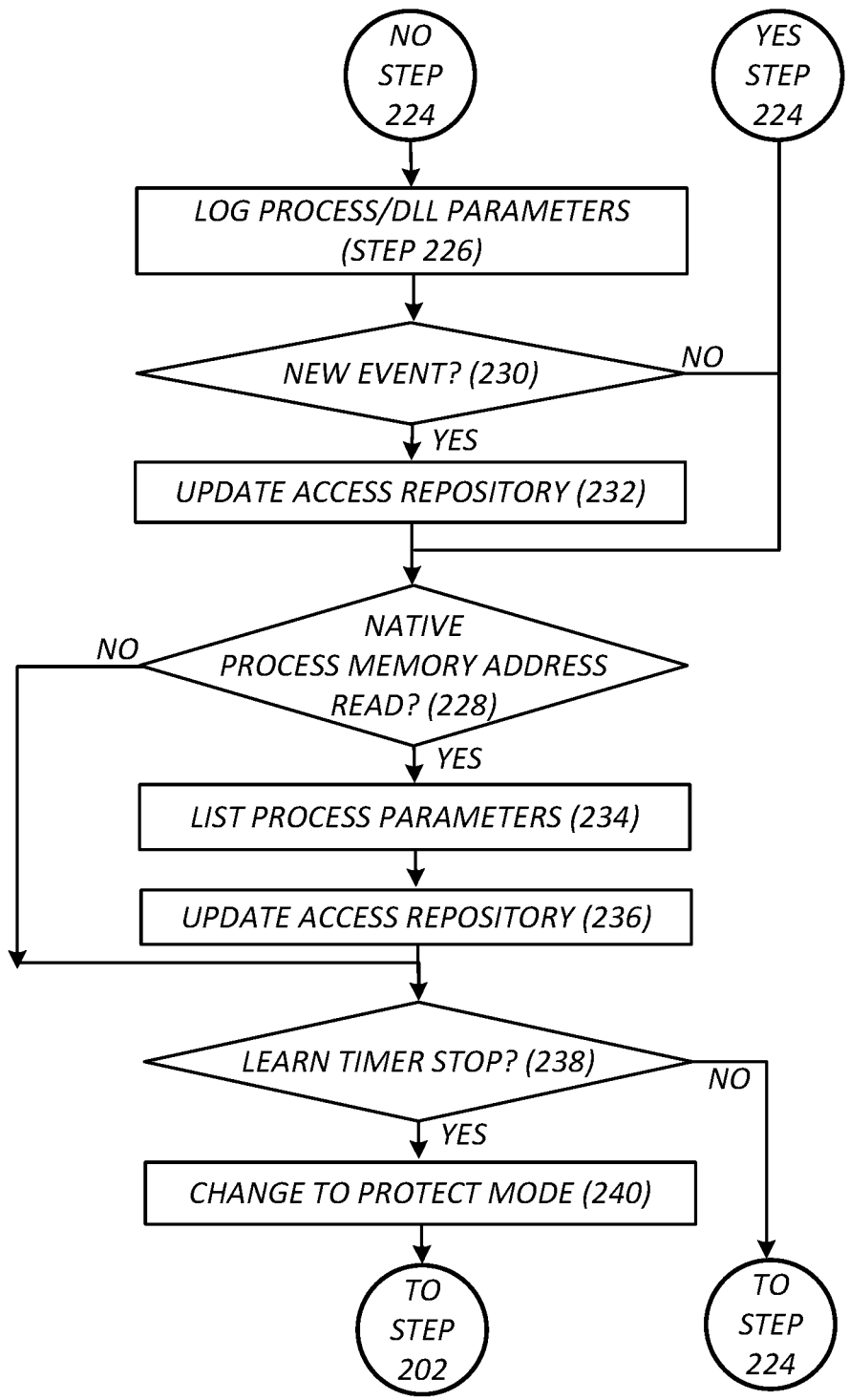
Figure 4C:
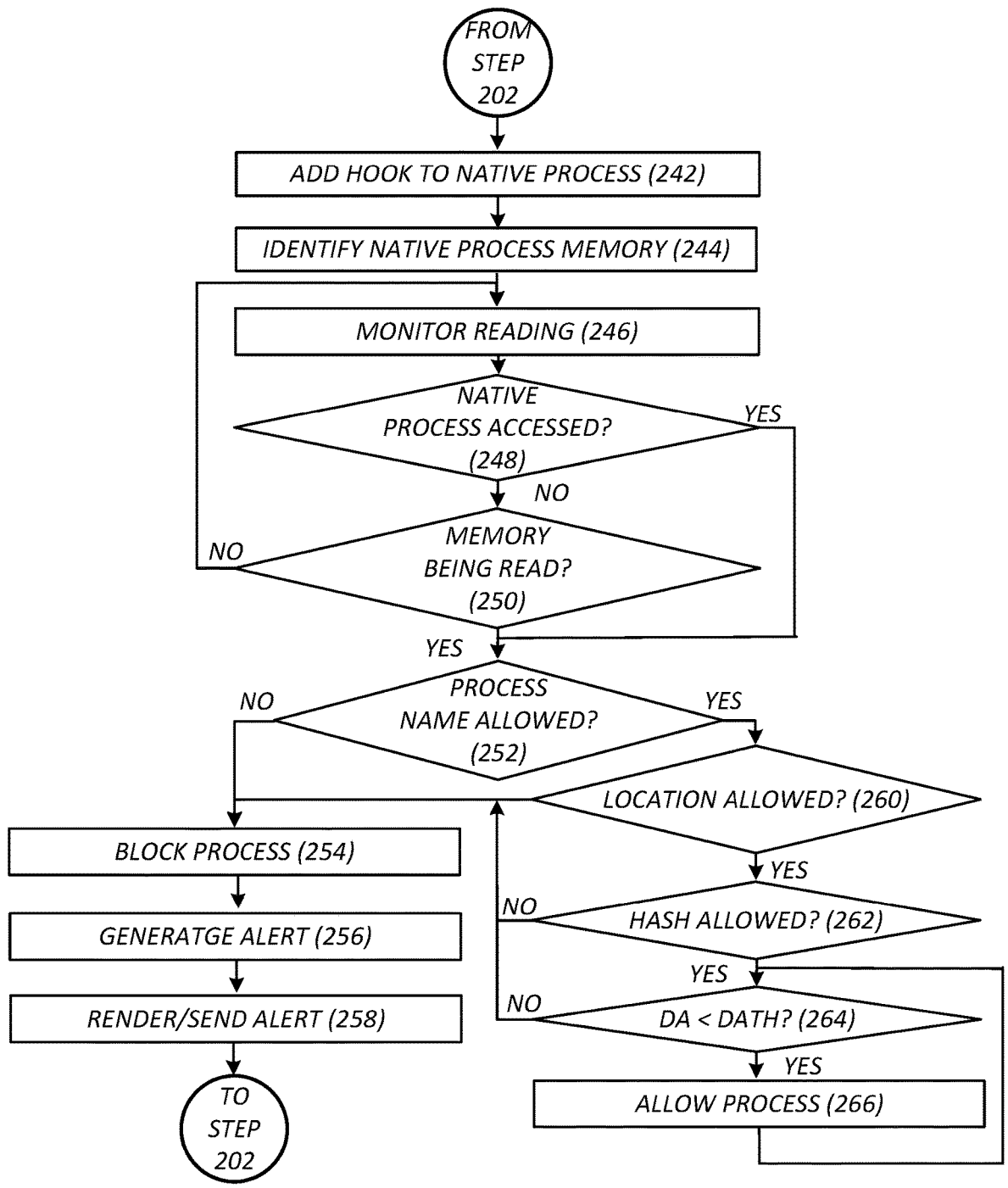

In an embodiment, the access repository 160C can be contained in the operating system, and the process monitor 160A and attack detector 160B can include kernel drivers that interact with the operating system kernel to operate according to, for example, the process 200 (shown in FIGS. 4A-4C).

The process monitor 160A can be arranged to monitor the data structures of all processes running code in-process with the native process on the operating system and create records of processes that are run during the "learning mode," including instantiated processes. When the process monitor 160A switches to the "protect mode," each new process that runs or attempts to run on the operating system can be analyzed and checked against the application repository 160D to determine whether it can be allowed to run on the operating system or to access the native process or native process memory; and, if it is determined that process is not allowed to run on the OS or OS kernel, that process can be suspended or terminated and the event logged in an event record that includes detailed information about the event, including, for example, file name, file location, process name, process identification number, process location, and process hash. The event record can be analyzed and evaluated to determine whether a particular process should be allowed or denied access or runtime, such as, for example, in a client-server mode.

The process monitor 160A can be arranged to interact with the event logging unit 170 or an internal event logger (not shown) contained by the operating system and used to record processes that have run or are being run on the operating system. The event logging unit 170 can be arranged to store the event records in, for example, the application repository 160D or storage 120 and protect the event records against deletion, editing or any other type of manipulation that might alter the data or the event record.

In an embodiment, the process monitor 160A can be arranged to interact with the event logging unit 170 or the internal event logger (not shown) in the operating system to monitor and check all processes that are reading from the native process memory, or that run computer code in-process with the native process and are reading credentials from memory.

The attack detector 160B can be arranged as a separate asset, as seen in FIG. 2, or integrated with the process monitor 160A as a single asset (not shown). The attack detector 160B can be arranged to compare the amount of data (DA) being read by a computing resource process ("suspect process") running code in-process with the native process (for example, lsass.exe) from memory against a predetermined data amount threshold $DA_{Th}$. If a determination is made that the amount of data DA read or being read by a process is greater than the predetermined data amount threshold $DA_{Th}$ value ($DA > DA_{Th}$), then an attack event can be predicted by the attack detector 160B. The attack detector 160 can be arranged to interact with the logging unit 170 and remediation unit 180 to trigger logging of the attack event, including all underlying information about the suspect process, as well as the actions taken in remediating the attack event. In a nonlimiting embodiment, the attack detector 160 can interact with the logging unit 170 or remediation unit 180 via a functional-call, initiating the logging or remediation process. The remediation process can include creating an alert signal, which can be rendered locally or sent, for example, to an asset (not shown) operated by a security analyst.

In a nonlimiting embodiment, the attack detector 160B can be arranged to compare a rate of data (DR) being read from the native process memory by a process running code in-process with the native process against a predetermined data rate threshold $DR_{Th}$ value. If it is determined that the data rate DR is greater than the data rate threshold $DR_{Th}$ value ($DR>DR_{Th}$), then an attack event can be predicted or detected by the attack detector 160B, and the attack event can be recorded.

The data rate threshold $DR_{Th}$ can be in units of, for example, bytes-per-second (b/s), and the data amount threshold $DA_{Th}$ can be in units of, for example, bytes. The attack detector 160B can be arranged to compare either or both the data amount (DA) and data rate (DR) against the data amount threshold value and data rate threshold value, respectively.

The data amount threshold $DA_{Th}$ or the data rate threshold $DR_{Th}$ can be set based on, for example, typical usages of the particular asset, such as, for example, the computing device 10 (shown in FIG. 1) to be monitored, or the particular user that uses the asset. For instance, the data amount threshold $DA_{Th}$ value can be set to the maximum amount of credential data that an authorized or whitelisted process in the computing device 10 might read from memory using code in-process with the native process during a single session or cycle of processor run-time. In a nonlimiting embodiment, the data amount threshold $DA_{Th}$ value can be set to, for example, 4500 bytes for a workstation that is connected to a domain, running Kerberos authentication with up six user accounts accessing the machine.

As noted above, in a nonlimiting embodiment the data amount threshold $DA_{Th}$ value can be determined by the ML model, which can be tuned over time as the ML model learns.

Similarly, the data rate threshold $DR_{Th}$ value can be set to the maximum data rate at which credential data might be read from memory by any process in the computing device 10 (shown in FIG. 1) that runs code in-process with the native process. In a nonlimiting embodiment, the data rate threshold $DR_{Th}$ value can be set to, for example, 36,000 bits/s ("bits per second") or 36 kibits/s or "kibbit per second."

The attack detector 160B can be arranged to set or adjust the threshold values $DR_{Th}$ or $DA_{Th}$, depending on the particular asset to be monitored (such as, for example, the computing device 10 or 30, shown in FIG. 1), the user of the asset to be monitored, network policies, or the security posture of the asset or the network to which the asset connects.

The access repository 160C can include a database that contains a table of all processes running on the operating system, including process parameters for each process. The process parameters can include, but are not limited to, process names, process identification numbers, canonical paths, file locations, process hashes and timestamps. The access repository 160C can include the amount of data (DA) being read from memory by each process using code in-process with the native process. The access repository 160C can include the rate (DR) at which data is being read from memory by each process using code in-process with the native process.

As noted earlier, the access repository 160C can be contained in the operating system running on the processor 110.

The application repository 160D can include a database that contains a table of all computing resources installed on an asset, such as, for example, the computing devices 10 or 30 (shown in FIG. 1). The application repository 160D can include, for each computing resource installed on the device, a computing resource name (for example, file name), a computing resource location (for example, file location) and process parameters, including for example, a process name, a process identification number, a process location (for example, canonical path) and a process hash. The application repository 160D can also include, for each computing resource, configuration data, Internet Protocol (IP) address, media access control (MAC) address, policies, and rules.

The application repository 160D can contain a table of all instantiated processes, including, process parameters for each instantiated process, such as, for example, instantiated process name, instantiated process identification number, instantiated hash and instantiated process canonical path. The application repository 160D can include a whitelist that contains a table of all computing resources on the asset that are approved or authorized to run on the operating system, including their process parameters. The whitelist can include a list of all computing resources or processes approved or authorized to run code in-process with the native application or native process, and the corresponding process parameters.

The logging unit 170 can be arranged as a separate asset (as seen in FIG. 2), or it can be integrated with the credential detector 160. Alternatively, the logging unit 170 can include the built-in event logger (not shown) in the operating system running on the processor 110. The logging unit 170 can be arranged to interact with the credential attack detector 160 and log event data, including attack event data and corresponding process parameters, amount of data (DA) and data rate (DR) for each process included in the event data.

The logging unit 170 can be arranged to interact with the application repository 160D or storage 120 and store or update an event log, including any or all events of interest that take place on the operating system. The event log can be maintained by the operating system and specific events cannot be deleted. The event log can include, for each event record, process parameters (for example, process name, process identification number, file location, canonical path and process hash), the amount of data (DA) read or being read from memory by the corresponding process running code in-process with the native process, the rate at which the data (DR) was read or being read from memory by the corresponding process running code in-process with the native process, and timestamp. The event records can include the data amount threshold value ($DA_{Th}$) and the data rate threshold value ($DR_{Th}$) used in detecting an attack event.

The remediation unit 180 can be arranged as a separate asset (as seen in FIG. 2), or integrated with the attack detector 160B (or process monitor 160A) as a single asset (not shown). The remediation unit 180 can be arranged to generate an attack event alert signal when the data amount DA or data rate DR value is determined (for example, by the attack detect detector 160B) to exceed the data amount threshold value $DA_{Th}$ or data rate threshold value $DR_{Th}$, respectively. The remediation unit 180 can be arranged to interact with the network interface 130 or IO interface 140 and cause the alert signal to be rendered locally on a display device (not shown) or sent to an asset (not shown) operated by, for example, a security analyst.

The remediation unit 180 can be arranged to interact with the operating system to terminate execution of any suspect process or the native process, or to block reading from the native process memory in response to an attack event determination by the attack detector 160B.

The remediation unit 180 can be arranged to interact with the logging unit 170 to update the event log, such as, for example, updating an event record to include the remediation process executed to stop an attack event, whether an alert signal was created or sent, or a destination to which an alert signal was sent.

FIGS. 4A-4C depict a flow diagram of a nonlimiting embodiment of a cybersecurity threat remediation process 200, according to the principles of the disclosure. The remediation process 200 can be carried out by the cybersecurity system 100 (shown in FIG. 2). In the "learning mode," the system 100 can be arranged to baseline and identify what is considered normal credential reading by processes in a given asset, and actively prevent malicious computing resources (for example, malware tools) from obtaining usernames or passwords that might be in plaintext when the system operates in the "protect mode." The system 100 can prevent extraction of passwords, Kerberos tickets, Pins, or usernames by tools such as Mimikatz.

After the remediation process 200 initializes on the processor 110, the operation mode can be checked to determine if the process is running in the "learning mode" or the "protect mode" (Step 202, FIG. 4A). This can be done by, for example, the process monitor 160A (shown in FIG. 2).

If it is determined that the process 200 is operating in the "learning mode" ("LEARN" at Step 202, FIG. 4A), then an internal clock or timer can be initialized for the "learn mode" (Step 204, FIG. 4A. The learn timer (Step 204, FIG. 4A) can be set to, for example, less than 30 days, 30 days, 60 days, 90 days, or more than 90 days. Expiration of the learn timer can determine when the learning mode ends. The protect mode can be switched to learning mode, for example, after computer resource updates, patches or installation of new computer resources on the asset.

The learn timer (Step 204, FIG. 4A) can be set to any other time period deemed appropriate by one of ordinary skill in the art, depending on factors such as, for example, risk tolerance of the operator of the asset (for example, computing device 10 or 30, shown in FIG. 1), whether or how frequently the asset is made accessible to or accesses the Internet, the criticality of the asset or its computer resources to an enterprise network or its operator, the level of exposure and the types of cyberattack vectors the asset might be vulnerable or exposed to, among other factors.

Learn Mode

After the learn timer is set and initialized (Step 204, FIG. 4A), each process running on the operating system can be checked (Step 206, FIG. 4A), for example, by the process monitor 160A (shown in FIG. 2), and a determination can be made whether any process is running for the first time on the operating system (Step 208, FIG. 4A).

Each process running on the OS can be checked by comparing its process parameters or data structure against existing process parameters or data structure contained in the application repository 160D (shown in FIG. 2). Any process for which matching data is not found in the application repository 160D can be determined to be a new or uninstantiated process, running for the first time on the operating system (NO at Step 208, FIG. 4A), otherwise a determination can be made that all process have run before on the operating system (YES at Step 208, FIG. 4A).

When a determination is made that a process is running for the first time on the operating system (NO at Step 208, FIG. 4A), then all the computing resources running processes on the operating system, as well as the processes themselves that are running on the operating system, can be enumerated (Step 210, FIG. 4A). Details of the enumerated computing resources and processes can be sent to the application repository 160D and stored in a table, which then can be updated with the details of the computing resources (including, for example, file name and file location) and processes, including process parameters (for example, process name, process identification number, process hash and canonical path) (Step 212, FIG. 4A). Once the application repository 160D (shown in FIG. 2) has been updated (Step 212, FIG. 4A), a hook can be added or injected to the native process (for example, lsass.exe) in order to monitor all interactions with other processes or libraries, including, for example, shared libraries, dynamic-link libraries (DLLs), or ActiveX control libraries (OCXs) (Step 218, FIG. 4A). The term "hook" covers a range of techniques that can be used to alter or augment the behavior of the operating system or of computing resources (for example, applications) by intercepting function calls or messages or events passed between computing resources.

If it is determined that all processes running on the OS have previously run on the OS (YES at Step 208, FIG. 4A), then the asset (for example, computing device 10, shown in FIG. 1) can be checked for any new computing resources that might have been installed on the asset (Step 214, FIG. 4A). If it is determined that a new computing resource has been installed on the asset (YES at Step 216, FIG. 4A), then the application repository 160D can be updated with the details for that computing resource, including, for example, file name and file location, as well as the process parameters for its process (Step 212, FIG. 4A).

If it is determined that no new computing resources have been installed on the asset (NO at Step 216, FIG. 4A), then a hook can be added or injected to the native process (for example, lsass.exe) in order to monitor all interactions with other processes or libraries (for example, DLLs) (Step 218, FIG. 4A).

After the hook is added (Step 218, FIG. 4A), the address of the memory where the native process has been moved into memory (for example, native process memory 120B, shown in FIG. 2) can be identified (Step 220, FIG. 4A). The memory address can include the virtual memory address, physical memory address, or both.

The process monitor 160A (shown in FIG. 2) can begin monitoring for any attempts to read from the native process memory (Step 222, FIG. 4A).

If a process (including, for example, DLL) attempts to access the native process (for example, lsass.exe) to read from the native process memory (YES at Step 224, FIG. 4A), then the details of the process can be logged, including process parameters (for example, process name, DLL name, process identification number, file location, and hash) (Step 226, FIG. 4B), otherwise (NO at Step 224, FIG. 4A) a check can be made to determine whether the native process memory is being read or attempted to be read (Step 228, FIG. 4B). It is noted that the term "process" can include a DLL.

Referring to FIG. 4B, after the details of the process are logged (Step 226, FIG. 4B), a determination can be made whether the event has occurred before (Step 230, FIG. 4B). In Step 230, the determination can be made by comparing the process parameters for that particular process against the process parameters in the access repository 160C (Shown in FIG. 2) and, if a match is found, determining the event has occurred before (NO at Step 230), otherwise determining the event is a new event (YES at Step 230).

If the event is determined to be a new event (YES at Step 230), then the access repository 160C (shown in FIG. 2) can be updated with the process parameters for that process (Step 232, FIG. 4B).

If the event is determined not to be a new event (NO at Step 230), or after the access repository 160C has been updated (Step 232, FIG. 4B), a check can be made to determine whether the native process memory is being read (Step 228). If it is determined that the native process memory is being read (YES at Step 232, FIG. 4B), then the details of the process reading data can be identified, including its process parameters (for example, process name, process location, process hash, and the data amount (DA) read from the native process memory) (Step 234, FIG. 4B), and the access repository 160C (shown in FIG. 2) can be updated with the identified process details, including process parameters (Step 236, FIG. 4B).

If, however, it is determined that the native process is not being read (NO at Step 228, FIG. 4B), then the learn timer can be checked to determine if it has finished or expired (Step 238, FIG. 4B).

If the learn timer has not expired (NO at Step 238, FIG. 4B), then any newly running processes running on the operating system can be checked (Step 224, FIG. 4A) and the subsequent steps repeated. However, if the learn timer has expired (YES at Step 238, FIG. 4B), then the operation mode of the process can be changed to "protect mode" and all writing to the application repository 160D can be disabled or blocked (Step 240, FIG. 4B).

Protect Mode

After the operating mode of the remediation process 200 is checked and determined to be the protect mode (PROTECT at Step 202, FIG. 4A), any process (including DLL) that attempts to connect to the native process or read from the native process memory can be checked against the application repository 160D (shown in FIG. 2) and if a match is determined, a hook can be added to the native process (Step 242, FIG. 4C). If no match is found in the application repository 160D, then that process can be terminated or blocked from connecting to the native process. For instance, the process can be terminated or blocked by the remediation unit 180 (shown in FIG. 2), and an alert signal can be generated, for example, by the alert generator 190 (shown in FIG. 2), and rendered locally on a display device (not shown) or sent to an asset (not shown) operated by a security analyst. The alert signal can include details of the blocked process, including process parameters, and the details of the corresponding computing resource, including file name and file location.

In an alternative embodiment, a hook can be added to the native process (Step 242, FIG. 4C) without checking the application repository 160D.

After the hook is added (Step 242, FIG. 4C), the address of the memory being used by the native process (the "native process memory"), such as, for example, the native process memory 120B (shown in FIG. 2), can be identified (Step 244, FIG. 4C). The memory address can include the virtual memory address, physical memory address, or both.

The process monitor 160A (shown in FIG. 2) can begin monitoring for any attempts to read from the native process memory (Step 246, FIG. 4C). A determination can be made whether the native process is being accessed by a process (including, for example, DLL) (Step 248, FIG. 4C).

If it is determined that the native process is not being accessed (NO at Step 248, FIG. 4C), then a check can be made whether the native process memory is being read (Step 250, FIG. 4C). If, however, it is determined that the native process is being accessed (YES at Step 248, FIG. 4C), then the process accessing the native process can be checked to determine whether that process is allowed (Step 252, FIG. 4C). The process can be checked (Step 252, FIG. 4C) by comparing its process parameters against the process parameters of previously logged or instantiated processes in the access repository 160C (shown in FIG. 2).

If a match is not found in the access repository 160C (shown in FIG. 2), then the process can be determined to be a prohibited process (NO at Step 252, FIG. 4C). The prohibited process can be terminated and blocked from executing on the operating system (Step 254, FIG. 4C), for example, by the remediation unit 180 (shown in FIG. 2). An alert can be generated, for example, by the alert generator 190 (shown in FIG. 2) (Step 256, FIG. 4C) and rendered locally (for example, on a display device, not shown) or sent to an asset (not shown) that is operated by a security analyst (Step 258, FIG. 4C).

If it is determined that the native process memory is being read (YES at Step 250, FIG. 4C), then the process reading the native process memory can be checked to determine whether the process name or process identification number is allowed (Step 252, FIG. 4C), otherwise a determination can be made whether the native process is being accessed by another process (NO at Step 250, then Step 248, FIG. 4C). In Step 252, the process name can be compared to the process names in the access repository 160C (shown in FIG. 2) for a match, and, if a match is found, then the process name can be determined to be allowed (YES at Step 252, FIG. 4C).

If the process name is determined to be allowed (YES at Step 252, FIG. 4C), then the access repository 160C (shown in FIG. 2) can be checked to determine whether the process location is allowed (Step 260, FIG. 4C) and whether the process hash is allowed (Step 262, FIG. 4C). The process location and process hash can be compared to process parameters in the access repository 160C for a matching process location and a matching process hash. When a matching process location is found in the access repository 160C, the process location can be allowed (YES at Step 260, FIG. 4C); and, when a matching process hash is found in the access repository 160C, the process hash can be allowed (YES at Step 262, FIG. 4C). However, if either the process location (NO at Step 260, FIG. 4C) or the process hash (NO at Step 262, FIG. 4C) does not have a match in the access repository 160C, then the process can be blocked (Step 254, FIG. 4C) and an alert generated (Step 256, FIG. 4C) and sent or rendered (Step 258, FIG. 4C).

In an embodiment, the remediation process 200 can be arranged to omit one or more Steps 252, 260 or 262, such that less than all three of the process name, process location, and process hash are analyzed and compared against the access repository 160C (shown in FIG. 2).

In alternative embodiments, the Steps 252, 260, 262 or 264 (shown in FIG. 4C) can arranged in any sequence, so long as all three process parameters, including process name, process location, and process hash, are checked against the access repository 160C (shown in FIG. 2) to determine whether a matching, corresponding entry exists in the access repository 160C; and, so long as the process parameter—the amount of data (DA) read from the native process memory—is monitored to ensure that it does not reach or exceed the predetermined data amount threshold ($DA_{TH}$). In those alternative embodiments, the process name, process location, and process hash must all have a respective match in the access repository 160C, and the total data amount (DA) read or being read from the native process memory must be less than the data amount threshold ($DA_{TH}$).

If the process is determined to be allowed (YES at Steps 252, 260 and 262, FIG. 4C), then the amount of data (DA) being read can be analyzed (Step 264, FIG. 4C). The data amount (DA) can be analyzed by monitoring and comparing the amount of data (for example, in total bytes) being read from the native process memory by, for example, the attack detector 160B (shown in FIG. 2). When it is determined that the data amount (DA) read from the native process memory is less than the predetermined data amount threshold ($DA_{TH}$), the process can be allowed to continue (Step 266, FIG. 4C). Should the data amount (DA) being read reach or exceed the data amount threshold ($DA_{TH}$) (NO at Step 264, FIG. 4C), then the process can be terminated and blocked (Step 254, FIG. 4C) and an alert generated (Step 256, FIG. 4C) and sent or rendered locally (Step 258, FIG. 4C).

As made evident by the nonlimiting examples discussed above, the system 100 can include a lightweight system that is able to run autonomously regardless of the version of the operating system. The system can operate without any hardcoded values to obtain access to memory locations that rely on, for example, KPCR and CR3 registers. The system 100 can be included in a platform that does not rely on kernel objects, and it can operate without being anchored down, instead using hooking in order to enumerate what can access a native process such as, for example, the lsass.exe process.

The instant system and methodology are able to not only detect and mitigate cleartext password dumping tools (when they are being executed), but also can mitigate cyberattack vectors that do not require the use of malware tools to extract cleartext passwords. For instance, the system and methodology can create a memory image of the native process memory, for example, by creating an lsass.exe process image either by using Microsoft utility tools (Process Explorer, ProcDump) or by using task manager.

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communicating device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions.

The terms "computer," "computing device" or "processor" can include, for example, without limitation, a communicating device, a computer resource, a processor, a microprocessor (X), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, μCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The terms "computer resource asset" or "computing resource asset" or "asset," as used in this disclosure, means a computing resource, a computing device or a communicating device, or any combination thereof.

The terms "computing resource process" or "computer resource process," as used in this disclosure, means a computing resource that is in execution or in a state of being executed on an operating system or an operating system kernel of a computing device. Every computing resource that is created, opened or executed on or by the operating system can create a corresponding "computing resource process." A computing or computer resource process can include one or more threads, as will be understood by those skilled in the art. Depending on the context, the term "process" can mean a "computing resource process."

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises at least one computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The terms "send," "sent," "transmission," or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for preventing extraction of an authentication credential from a memory in a computer, the method comprising:
   identifying a memory area used by a native process;
   monitoring the memory area for any access of the memory area by a process;
   detecting when data is being read from the memory area;
   detecting an amount of data being read from the memory area;
   comparing the amount of data being read from the memory area to a data amount threshold value;
   blocking access to the memory area or terminating said process when the amount of data being read from the memory area reaches or exceeds the data amount threshold,
   wherein the native process includes a Windows® operating system lsass.exe process;
   checking if the computer-implemented method is in a learning mode or a protect mode,
   wherein the protect mode switches to the learning mode after one of the following:
   computer resource updates, patches, or installation of new computer resources; and,
   in the event that the computer-implemented method is in the learning mode, allowing data in an access repository to be updated.

2. The computer-implemented method in claim 1, further comprising:
  generating an alert signal when the amount of data being read from the memory area reaches or exceeds the data amount threshold.
3. The computer-implemented method in claim 1, further comprising:
  determining a process parameter for said process,
  wherein the process parameter includes at least one of a process name, a process location and a process hash.
4. The computer-implemented method in claim 1, wherein the authentication credential comprises a cleartext password, a password hash or a Kerberos token.
5. The computer-implemented method in claim 3, further comprising:
  checking if said process is an allowed process based on the process parameter.
6. The computer-implemented method in claim 3, further comprising:
  comparing the process parameter against data in the access repository; and
  determining if the data in the access repository includes a matching process parameter.
7. The computer-implemented method in claim 6, further comprising:
  determining said process is an allowed process when the data in the access repository includes the matching process parameter.
8. The computer-implemented method in claim 6, further comprising:
  determining said process is not an allowed process when the data in the access repository does not include the matching process parameter.
9. A system for preventing extraction of an authentication credential from a memory in a computer, the system comprising:
  a non-transitory computer readable storage medium containing a process monitor having a learning mode and a protect mode arranged to
    identify a memory area used by a native process,
    monitor the memory area for any access by a process,
    detect when data is being read from the memory area, and
    detect an amount of data being read from the memory area;
  an attack detector arranged to
    compare the amount of data being read from the memory area to a data amount threshold value, and
    detect a cyberattack event when the amount of data being read from the memory area reaches or exceeds the data amount threshold;
  a remediation unit arranged to block access to the memory area or terminate said process based on the cyberattack event,
  wherein the native process includes a Windows® operating system lsass.exe process;
  wherein the protect mode switches to the learning mode after one of the following:
  computer resource updates, patches, or installation of new computer resources; and,
  wherein data in an application repository is allowed to be updated in the event that the process monitor is in the learning mode.
10. The system in claim 9, further comprising:
  an alert generator arranged to generate an alert signal based on the cyberattack event.
11. The system in claim 9, further comprising:
  an access repository containing a process parameter,
  wherein the process parameter includes at least one of a process name, a process location, a process hash and the amount of data being read from the memory area.
12. The system in claim 9, wherein the application repository contains a table of computing resources or processes allowed to run on an operating system.
13. The system in claim 12, wherein the application repository contains a process parameter for each computing resource or process in the table computing resources or processes, and wherein the process parameter includes at least one of a computing resource name or process name, a computing resource or process location, and a process hash.
14. The system in claim 12, wherein the table of computing resources or processes comprising all computing resources or processes installed in the computer.
15. A non-transitory computer readable storage medium containing credential extraction prevention program instructions for preventing extraction of an authentication credential from a memory in a computer, the program instructions, when executed by a processor, causing the processor to perform an operation comprising:
  identifying a memory area used by a native process;
  monitoring the memory area for any access of the memory area by a process;
  detecting when data is being read from the memory area;
  detecting an amount of data being read from the memory area;
  comparing the amount of data being read from the memory area to a data amount threshold value;
  blocking access to the memory area or terminating said process when the amount of data being read from the memory area reaches or exceeds the data amount threshold,
  wherein the native process includes a Windows® operating system lsass.exe process;
  checking if the operation is in a learning mode or a protect mode,
  wherein the protect mode switches to the learning mode after one of the following:
  computer resource updates, patches, or installation of new computer resources; and,
  in the event that the operation is in the learning mode, allowing data in an access repository to be updated.
16. The computer readable storage medium in claim 15, the operation further comprising:
  generating an alert signal when the amount of data being read from the memory area reaches or exceeds the data amount threshold.
17. The computer readable storage medium in claim 15, the operation further comprising:
  determining a process parameter for said process,
  wherein the process parameter includes at least one of a process name, a process location and a process hash, and
  wherein the authentication credential comprises a cleartext password.
18. The computer readable storage medium in claim 17, the operation further comprising:
  comparing the process parameter against data in the access repository; and
  determining if the data in the access repository includes a matching process parameter.

19. The computer readable storage medium in claim 18, the operation further comprising:
- determining said process is an allowed process when the data in the access repository includes the matching process parameter; or
- determining said process is not an allowed process when the data in the access repository does not include the matching process parameter.

* * * * *